(12) United States Patent
Rosenberg et al.

(10) Patent No.: US 10,452,763 B2
(45) Date of Patent: Oct. 22, 2019

(54) AUTOCOMPLETE FOR INTEGRATING DIVERSE METHODS OF ELECTRONIC COMMUNICATION

(75) Inventors: Greg A. Rosenberg, San Mateo, CA (US); Kevin R. Johnston, San Francisco, CA (US); Samir B. Mehta, San Francisco, CA (US)

(73) Assignee: OATH INC., New York, NY (US)

( * ) Notice: Subject to any disclaimer, the term of this patent is extended or adjusted under 35 U.S.C. 154(b) by 2134 days.

(21) Appl. No.: 11/716,121

(22) Filed: Mar. 8, 2007

(65) Prior Publication Data

US 2008/0222256 A1    Sep. 11, 2008

(51) Int. Cl.
| | | |
|---|---|---|
| G06F 3/0481 | (2013.01) | |
| G06F 17/24 | (2006.01) | |
| G06F 17/27 | (2006.01) | |

(52) U.S. Cl.
CPC ............ *G06F 17/24* (2013.01); *G06F 17/276* (2013.01); *G06F 3/0481* (2013.01)

(58) Field of Classification Search
CPC ..... H04L 68/403; G06F 3/048; G06F 3/0481; G06F 17/276; G06F 17/24
USPC ......... 715/752, 753, 816, 226; 709/204, 205
See application file for complete search history.

(56) References Cited

U.S. PATENT DOCUMENTS

| | | | |
|---|---|---|---|
| 5,896,321 A * | 4/1999 | Miller et al. ............. | 365/189.15 |
| 6,208,339 B1 * | 3/2001 | Atlas et al. .................. | 715/780 |
| 6,341,280 B1 * | 1/2002 | Glass et al. ....................... | 707/3 |
| 6,377,965 B1 * | 4/2002 | Hachamovitch et al. ..... | 715/203 |
| 6,564,213 B1 * | 5/2003 | Ortega et al. ..................... | 707/5 |
| 6,671,508 B1 | 12/2003 | Mitsuoka et al. | |
| 7,080,148 B2 | 7/2006 | Weigand | |
| 7,181,497 B1 * | 2/2007 | Appelman et al. ........... | 709/206 |
| 7,512,652 B1 * | 3/2009 | Appelman et al. ........... | 709/204 |
| 7,549,125 B2 * | 6/2009 | Dunn et al. .................... | 715/739 |
| 2001/0002469 A1 * | 5/2001 | Bates et al. ....................... | 707/1 |
| 2001/0003202 A1 | 6/2001 | Mache et al. | |
| 2001/0047305 A1 | 11/2001 | Bowen, Jr. | |
| 2002/0007398 A1 | 1/2002 | Mendiola et al. | |

(Continued)

OTHER PUBLICATIONS

International Search Report dated Jul. 31, 2008, for PCT Application No. PCT/US2008/054622, filed on Feb. 21, 2008, four pages.

(Continued)

*Primary Examiner* — Tuyetlien T Tran
(74) *Attorney, Agent, or Firm* — James J. DeCarlo; Greenberg Traurig, LLP

(57) ABSTRACT

Instant messaging, also known as chat, is integrated with electronic mail in a user interface that provides for automatic completion of recipient names or addresses, such as email addresses or chat addresses, as a user types characters of the name or address when addressing a message. The automatic completion feature displays a list of matches, which are names or addresses in, for example, the user's online contact list, that match the characters the user types. The matches list may contain names or addresses for multiple different communication methods. The user may then select one of the names or addresses to compose a message to be sent to the selected name or address. A user interface is then provided for composing a message to be sent to the selected name or address using the communication protocol associated with the selected name or address.

16 Claims, 8 Drawing Sheets

(56) References Cited

U.S. PATENT DOCUMENTS

| | | |
|---|---|---|
| 2002/0099775 A1* | 7/2002 | Gupta et al. ............... 709/205 |
| 2002/0099777 A1* | 7/2002 | Gupta et al. ............... 709/206 |
| 2002/0107856 A1 | 8/2002 | Scheussler et al. |
| 2002/0108052 A1 | 8/2002 | Maruyama |
| 2003/0228722 A1 | 12/2003 | Wristers et al. |
| 2003/0229722 A1 | 12/2003 | Beyda |
| 2004/0054736 A1* | 3/2004 | Daniell et al. ............. 709/206 |
| 2004/0073621 A1 | 4/2004 | Sampson |
| 2004/0078446 A1 | 4/2004 | Daniell et al. |
| 2004/0078448 A1 | 4/2004 | Malik et al. |
| 2004/0096043 A1* | 5/2004 | Timmins et al. ......... 379/88.22 |
| 2004/0119732 A1* | 6/2004 | Grossman et al. ........... 345/708 |
| 2004/0153519 A1* | 8/2004 | Stolze ........................... 709/206 |
| 2004/0181550 A1 | 9/2004 | Warsta et al. |
| 2004/0199582 A1* | 10/2004 | Kucharewski et al. ...... 709/204 |
| 2004/0210844 A1* | 10/2004 | Pettinati et al. ............. 715/708 |
| 2005/0044423 A1* | 2/2005 | Mellmer et al. ............. 713/201 |
| 2005/0071434 A1 | 3/2005 | Hettish et al. |
| 2005/0091072 A1* | 4/2005 | Dunn et al. ..................... 705/1 |
| 2005/0091272 A1* | 4/2005 | Smith et al. ............... 707/104.1 |
| 2005/0091329 A1 | 4/2005 | Friskel |
| 2005/0108344 A1* | 5/2005 | Tafoya et al. ............... 709/206 |
| 2005/0131888 A1* | 6/2005 | Tafoya et al. .................. 707/3 |
| 2005/0132012 A1 | 6/2005 | Muller et al. |
| 2005/0182741 A1* | 8/2005 | Grossman et al. .............. 707/1 |
| 2005/0198144 A1* | 9/2005 | Kraenzel et al. ............ 709/206 |
| 2005/0283468 A1* | 12/2005 | Kamvar et al. .................. 707/3 |
| 2005/0289470 A1* | 12/2005 | Pabla et al. ................... 715/751 |
| 2006/0010104 A1* | 1/2006 | Pettinati et al. .................. 707/3 |
| 2006/0025164 A1* | 2/2006 | Wang et al. ................. 455/466 |
| 2006/0035632 A1* | 2/2006 | Sorvari et al. ............... 455/418 |
| 2006/0041545 A1* | 2/2006 | Heidloff et al. .................. 707/4 |
| 2006/0052127 A1 | 3/2006 | Wolter |
| 2006/0101116 A1* | 5/2006 | Rittman et al. .............. 709/204 |
| 2006/0101119 A1* | 5/2006 | Qureshi et al. .............. 709/206 |
| 2006/0156233 A1* | 7/2006 | Nurmi ......................... 715/532 |
| 2006/0168315 A1 | 7/2006 | Daniell et al. |
| 2006/0218503 A1* | 9/2006 | Matthews ............ G06F 9/4443 715/779 |
| 2006/0230012 A1* | 10/2006 | Ruvolo et al. ................... 707/1 |
| 2006/0282575 A1* | 12/2006 | Schultz et al. ................ 710/62 |
| 2006/0288298 A1* | 12/2006 | Haitani et al. ............... 715/739 |
| 2007/0002825 A1 | 1/2007 | O'Brien et al. |
| 2007/0011186 A1 | 1/2007 | Horner et al. |
| 2007/0032267 A1* | 2/2007 | Haitani et al. ............. 455/556.2 |
| 2007/0115991 A1* | 5/2007 | Ramani et al. ............... 370/392 |
| 2007/0150553 A1* | 6/2007 | Fields et al. ................. 709/219 |
| 2007/0174477 A1* | 7/2007 | Bostick et al. ............... 709/231 |
| 2007/0198474 A1* | 8/2007 | Davidson et al. ................ 707/3 |
| 2007/0288575 A1* | 12/2007 | Gillum et al. ................ 709/206 |
| 2008/0033779 A1* | 2/2008 | Coffman et al. .................. 705/9 |
| 2008/0037733 A1* | 2/2008 | Chen et al. ............... 379/88.22 |
| 2008/0076472 A1* | 3/2008 | Hyatt ........................... 455/557 |
| 2008/0208812 A1* | 8/2008 | Quoc et al. ....................... 707/3 |

OTHER PUBLICATIONS

Written Opinion dated Jul. 31, 2008, for PCT Application No. PCT/US2008/054622, filed on Feb. 21, 2008, four pages.

Final Office Action dated Sep. 18, 2009, for U.S. Appl. No. 11/710,050, filed Feb. 23, 2007, twelve pages.

International Preliminary Report on Patentability dated Sep. 3, 2009, for PCT Application No. PCT/US2008/054622, filed on Feb. 21, 2008, six pages.

Non-Final Office Action dated Apr. 3, 2009, for U.S. Appl. No. 11/261,984, filed Oct. 28, 2005, twelve pages.

Non-Final Office Action dated Apr. 30, 2009, for U.S. Appl. No. 11/710,050, filed Feb. 23, 2007, twelve pages.

U.S. Appl. No. 11/261,984, filed Oct. 28, 2005, for Thompson et al.

U.S. Appl. No. 11/710,050, filed Feb. 23, 2007, for Rosenberg et al.

* cited by examiner

To: | G| | —106
111 { 108 — David Garlic
      112 — garth@yahoo.com

FIG. 1D

To: | Ga| | —112
127 {
114 — Online Now! Send a chat message
116 — garthbrookslover99
118 — Jennie Garth                    —110
120 — David Garlic <dgarlic22@isp.net>  125
122 — garth@yahoo.com
}

FIG. 1E

To: | Ga| | —112
187 {
120 — David Garlic <dgarlic22@isp.net>  } 190
122 — garth@yahoo.com
114 — Online Now! Send a chat message   125 }
116 — garthbrookslover99                    } 192
118 — Jennie Garth
180 — Send a text message              185
182 — gary jones (650-555-1212)            } 194
184 — Jesse Garvey (408-555-1212)
}
                                       181

AUTOCOMPLETE FOR INTEGRATING DIVERSE METHODS OF ELECTRONIC COMMUNICATION

BACKGROUND OF THE INVENTION

Field of the Invention

The present invention relates generally to electronic communication, and more specifically to techniques for selecting recipients in electronic communication.

Description of the Related Art

A communication address, such as an email or chat address, is generally associated with a communication method, i.e., protocol. For example, a chat address is associated with a chat protocol such as YMSG, and an email address is associated with an email address such as SMTP. Therefore, a single recipient, such as a person, may have multiple different addresses, ore for each protocol that the person uses. Addresses that identify the same person in different protocols are often different, because different protocols often have different addressing syntax. For example, a person named Jennie Garth may have the email address "garth@yahoo.com" and the chat address "Jennie Garth."

Existing communication interfaces, such as Microsoft® Outlook™, and Yahoo® Messenger, generally expect users to enter the protocol-specific address when sending a message. Furthermore, existing interfaces generally accept addresses for a single communication method. A user typically chooses the communication method to be used for sending a message, and selects the appropriate interface, e.g., an email client or email service web page for email, or an instant messenger client or web page for chat. The user then enters the protocol-specific address of the intended recipient of the communication, and enters the content for the communication, along with protocol-specific values, such as a subject for an email message.

In these existing interfaces, the user is generally burdened with determining the appropriate or most effective communication protocol for communicating with an intended recipient, with selecting the appropriate user interface, with remembering the protocol-specific address of the intended recipient, and with entering the protocol-specific address in the user interface. Therefore, it would be desirable to have a user interface that manages protocol addresses for the user, and allows a user to compose a message using the appropriate protocol address.

SUMMARY OF THE INVENTION

In general, in a first aspect, the invention features message composition apparatus. The message composition apparatus includes input logic for receiving an input string, the input string having at least one character, display logic for displaying a match list in response to receiving the input string, wherein the match list includes a first match, the first match includes the input string, and the first match is associated with a first communication method and a first communication address, and address logic for addressing the message to the first communication address in response to selection of the first match from the match list.

Embodiments of the invention may include one or more of the following features. The message composition apparatus may include transmission logic for causing the message to be sent to the first communication address via the first communication method if the first match is selected from the match list. The first match may include the input string if the input string matches at least a portion of an identifying string associated with the first match. The address logic may address the message to the first communication address by adding the first communication address to an address attribute associated with the message.

The match list may include a second match, where the second match includes the input string, and the second match is associated with a second communication method and a second communication address, and where the address logic is operable to address the message to the second communication address in response to selection of the second match from the match list. The second match may include the input string if the input string matches at least a portion of an identifying string associated with the first match. The message composition apparatus may include transmission logic for causing the message to be sent to the second communication address via the second communication method if the second match is selected from the match list. The address logic may address the message to the second communication address by adding the second communication address to an address attribute associated with the message. The match list may be displayed in an area on a computer screen, the area comprising a first region and a second region, and the display logic may be operable to display the first match in the first region, and further operable to display the second match in the second region. The list of matches may be updated as characters of the input string are received. The communication method may be selected from the group consisting of email, chat, and text messaging. The first candidate recipient may be selected from an online contact list, an online address book, an online directory service, or a combination thereof.

The display logic may display a first user interface configuration based upon the first communication method in response to selection of the first match from the match list. The display logic may display a second user interface configuration based upon the second communication method in response to selection of the second match from the match list. At least one attribute received for use with the first user interface configuration may be available for use with the second user interface configuration. The second user interface configuration may replace the first user interface configuration subsequent to selection of the first match.

The message composition apparatus may further include logic for providing a message composition user interface configuration in response to selection of the first match from the match list, where the user interface configuration includes at least one input component for receiving at least one data value, the user interface configuration is based upon the first communication method, the at least one input component corresponds to an attribute of the message, wherein the attribute is to be provided to the communication method when the message is sent, and the user interface includes a send component for causing the message to be sent via the communication method in response to a user action. The communication method may be email, and the at least one input component may include a message content component and a message subject component. The communication method may be chat, and the at least one input component may include a message content component.

In general, in a second aspect, the invention features a computer-based method of completing a message address. The method includes receiving an input string having at least one character, displaying a list of matches in response to receiving the input string, selecting a first address from a data source that provides addresses; wherein the list of matches includes the first address if the input string matches at least a portion of the first address, selecting a second address from the data source that provides addresses, wherein the list of matches includes the second address if the input string matches at least a portion of the second address, receiving selection of a chosen address from the list of matches, and addressing the message to the chosen address.

Embodiments of the invention may include one or more of the following features. The data source that provides addresses may include an online address book, an online contact list, a list retrieved from an online service, or a combination thereof. The method may further include the step of providing a message composition user interface configuration, wherein the user interface configuration includes at least one input component for receiving at least one data value, the user interface configuration is based upon a communication method associated with the chosen address, the at least one input component corresponds to at least one attribute of the message, wherein the at least one attribute is to be provided to the communication method when the message is sent, and the user interface includes a send component for causing the message to be sent via the communication method in response to a user action. The user interface configuration may include an input component for receiving the chosen address, and addressing the message to the chosen address may include adding the chosen address to the input component. The communication method may include email, and the at least one input component may include a message content component and a message subject component. The communication method may include chat, and the at least one input component may include a message content component.

In general, in a third aspect, the invention features a user interface for automatically completing a message recipient name. The user interface includes a display component for displaying a first match in response to receiving an input string, wherein the first match is associated with a first identifying string, and the input string matches at least a portion of the first identifying string, wherein the first match is associated with a first communication method, the display component is operable to display a second match in response to receiving the input string, wherein the second match is associated with a second identifying string, the input string matches at least a portion of the second identifying string, and wherein the second match is associated with a second communication method. The user interface also includes interface configuration logic for causing a first interface to be displayed in response to selection of the first match, wherein the first interface is operable to cause received message content to be sent via the first communication method to a first address associated with the first match, and the interface configuration logic is operable to cause a second interface to be displayed in response to selection of the second match, wherein the second interface is operable to cause received message content to be sent via the second communication method to a second address associated with the second match. The first communication method may be email, chat, or text messaging, and the second communication method may be email, chat, or text messaging.

In general, in a fourth aspect, the invention features a computer program product comprising program code for composing a message. The computer program product includes program code operable to receive an input string, the input string having at least one character, program code operable to display a match list in response to receiving the input string, wherein the match list includes a first match, the first match includes the input string, and the first match is associated with a first communication method and a first communication address, and program code operable to address the message to the first communication address in response to selection of the first match from the match list.

Embodiments of the invention may include one or more of the following features. The computer program product may include program code operable to cause the message to be sent to the first communication address via the first communication method if the first match is selected from the match list. The first match may include the input string if the input string matches at least a portion of an identifying string associated with the first match. The program code operable to address the message may be further operable to address the message to the first communication address by adding the first communication address to an address attribute associated with the message. The match list may include a second match, where the second match includes the input string, and the second match is associated with a second communication method and a second communication address, and where the address logic is operable to address the message to the second communication address in response to selection of the second match from the match list. The second match may include the input string if the input string matches at least a portion of an identifying string associated with the first match.

BRIEF DESCRIPTION OF THE DRAWINGS

FIGS. 1A and 1B are illustrative drawings of an address input component in accordance with embodiments of the invention.

FIG. 1C is an illustrative drawing of an address input component and a list of email address matches in accordance with embodiments of the invention.

FIG. 1D is an illustrative drawing of an address input component and a list of matches for multiple communication methods in accordance with embodiments of the invention.

FIG. 1E is an illustrative drawing of an address input component and a list of matches for three communication methods in accordance with embodiments of the invention.

DETAILED DESCRIPTION OF THE INVENTION

Figure 1F:
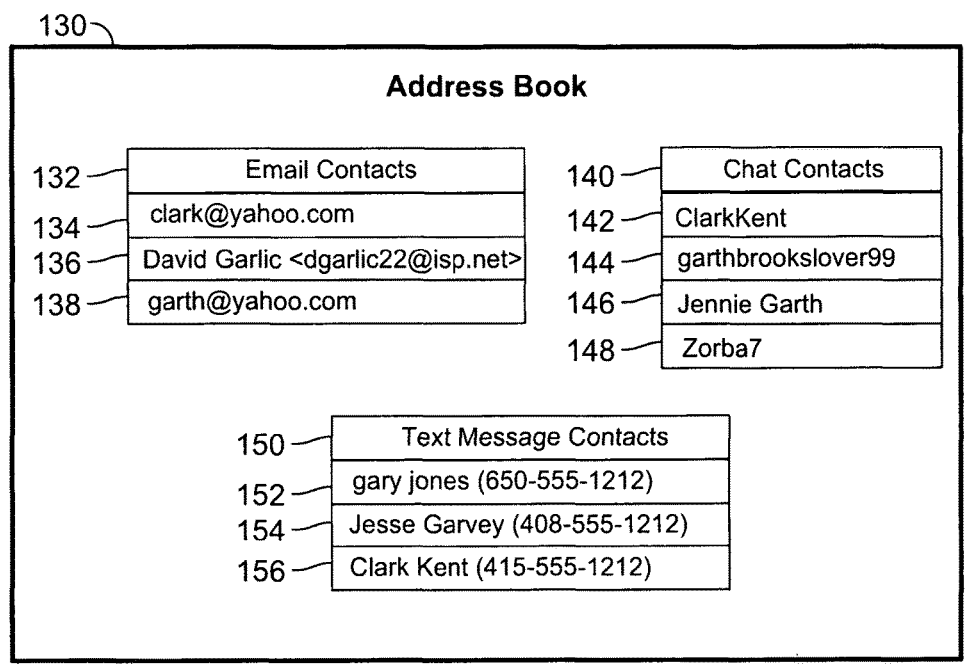
FIG. 1F is an illustrative drawing of an address book data source in accordance with embodiments of the invention.

The following description is presented to enable any person skilled in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

This application is related to the co-assigned U.S. patent application entitled "User Interface For Transitioning Between Chat And Email," Ser. No. 11/710,050, which is incorporated by reference herein in its entirety. This application is also related to the co-assigned U.S. patent application entitled "User Interface for Integrating Diverse Methods of Communication," Ser. No. 11/261,984, which is incorporated by reference herein in its entirety.

FIGS. 1A and 1B are illustrative drawings of an address input component in accordance with embodiments of the invention. FIG. 1A shows an address input component 102, which is, in one example, a user interface component for receiving an address to which a message is to be sent. The address may be received in the input component 102 as a user (not shown) types characters of an address, such as an electronic mail (i.e., email) address, or, in another example, an instant messaging (i.e., chat) address. In one example, an address is a string of characters that identifies an intended recipient of a message. The address may be, for example, an email address, a chat address, a user name, a distribution list name, a group alias name, or any other identifier that may be accepted by a communication protocol to identify an intended recipient. That is, the term address is not meant to exclude identifiers that might more commonly be referred to as "names." The term address may refer to a protocol address (e.g., an email address or an instant messaging address), a user name that can be mapped to a protocol address, or any other identifier. The input component 102, and the other user interface components described herein, appear on, for example, a computer screen, and are updated by computer program code in response to user input.

In FIG. 1A, no text has been received in the input component 102, and only a cursor is displayed, as a vertical line, in the text input area of the input component 102. The cursor indicates that the next character the user types will be appended to the input string (as long as the input focus remains on the input component 102).

In FIG. 1B, two text characters have been received to form the input string "Zw," which is shown in the input component 104. The cursor is displayed to the right of the input string to indicate that the next character the user types will be appended to the input string. The text characters may be received, for example, from a user who has entered them on a computer keyboard, or from a computer program that supplies then automatically.

FIG. 1C is an illustrative drawing of an address input component and a list of email address matches in accordance with embodiments of the invention. Address matches are generated by matching characters typed by a user in the input component 106, to known addresses associated with one or more communication protocols. In one example, known addresses are retrieved from a database or table of addresses, such as an address book or contact list.

FIG. 1F is an illustrative drawing of an address book data source in accordance with embodiments of the invention. FIG. 1F shows the contents of the user's address book 130. The address book 130 is shown for illustrative purposes and is not necessarily displayed with or used by the interface features shown in FIGS. 1A-1E. Other sources of addresses may be used in place of the address book 130, such as a directory service or another type of table listing communication addresses of other users. The address book 130 includes three email addresses in an Email Contacts list 132. The email addresses are Clark@yahoo.com 134, David Garlic <dgarlic@yahoo.com> 136, and garth@yahoo.com 138. The address book 130 also includes four chat addresses in a Chat Contacts list 140. Each of these addresses, e.g., Clark@yahoo.com, is an identifying string for a recipient. The recipient is a user or other entity that will receive communication or messages sent to the address. The identifying string may or may not be the same as the address. In one example, the identifying string is the address. In another example, the identifying string comprises a combination of a name of the recipient (e.g., David Garlic) and an address of the recipient (e.g., dgarlic22@isp.net). So, for example, an identifying string for David Garlic would be "David Garlic <dgarlic22@isp.net>".

The chat addresses are ClarkKent 142, garthbrookslover99 144, Jennie Garth 146, and Zorba7 148. The identifying strings for these chat addresses are, in one example, the same as the chat addresses, e.g., "ClarkKent", "garthbrookslover99", and "Jennie Garth", respectively.

The address book 130 also includes three text message addresses in a Text Message Contacts list 150. The text message addresses are gary jones (650-555-1212) 152, Jesse Garvey (408) 555-1212 154, and Clark Kent (415) 555-1212 156. The text message addresses include a name and a number. The names, e.g., gary jones, are descriptive names associated with the addresses. In the case of email and chat, the names may be the actual email and chat addresses, respectively. In the case of text message addresses, the names are descriptions associated with phone numbers, and the phone numbers are the actual addresses. The identifying strings for these text message addresses are, in one example, the same as the text message addresses, e.g., "gary jones (650-555-1212)" and "Jesse Garvey (408-555-1212)".

In one example, an association may be established between different addresses that represent the same recipient or person. For example, an email address may be associated with the corresponding chat address. For example, if a user named Jennie Garth has the email address garth@yahoo.com and the chat address "Jennie Garth," an association may be established between the garth@yahoo.com email address and the "Jennie Garth" chat address. In one example, that association is maintained for internal processing purposes, but is not displayed in the user interface. In another example, that association may be displayed, for example, by displaying the same icon or image adjacent to both addresses.

In FIG. 1A, no matches are displayed because no input characters have been received. In FIG. 1B, no matches are displayed because none of the entries in the address book 130 include words that begin with the prefix "Zw."

FIG. 1C shows matches of email addresses generated by the input string "G". A single input character "G" has been received in an input component 106. The input "G" matches the prefixes of words in two recipient addresses in the Email Contacts section 132 of the user's address book 130, David Garlic 136 and garth@yahoo.com 138, so those two addresses are displayed as an email match list 111 as matches David Garlic 108 and garth@yahoo.com 112. A match may comprise a name or address (or name-address combination) displayed in a match list. A user can select one of the matches 108, 112 to cause a message to be sent to the name or address associated with the match, or to begin composing a message using the communication method (i.e., protocol) associated with the selected match. In this example, the associated communication protocol is email. Since David Garlic 136 and garth@yahoo.com 138 are the only two entries in the Email Contacts 132 that that include a word starting with the letter G, they are the only matches shown in the email match list 111.

FIG. 1D is an illustrative drawing of an address input component and a list of matches for multiple communication methods in accordance with embodiments of the invention. The address input component 112 of FIG. 1D receives character input and displays email and chat addresses that match the character input. The matching addresses are displayed as a match list 127 that includes chat addresses that match the input string, as well as email addresses that match the input string. A string of two input characters, "Ga," has been received in an input component 112. The input "Ga" matches the prefixes of words in two recipient addresses in the Email Contacts section 132 of the user's address book 130, David Garlic 108 and garth@yahoo.com 110, so those two addresses are displayed in the match list 127 as garthbrookslover99 116 and Jennie Garth 118, respectively. The prefix of the addresses that matched the input string may be shown in bold in the match list 127. In this example, since the input string is "Ga", the Ga or ga prefix of each match is shown in bold in each of the entries of the match list 127 (the string matching is case-insensitive in this example). In one example, matches for the same type of communication method are grouped together in the displayed match list 127. The input "Ga" also matches the prefixes of words in two recipient addresses in the Chat Contacts section 140 of the user's address book 130, garthbrookslover99 144 and Jennie Garth 146, so those two addresses are displayed in the match list 127 as David Garlic 120 and garth@yahoo.com 122, respectively. A label 114, with the text "Online Now!", is displayed in the match list above the chat matches to indicate that the chat users are presently online. The matches for different types of communication methods may be separated in the displayed match list 127 by a separator, e.g., a horizontal bar 125. In FIG. 1D, the chat address matches appear in a group above the bar 125, and the email matches appear below the bar 125. Other orderings of the groups are possible, and the matches need not be grouped. For example, the chat address matches could appear below the bar 125, and the email matches could appear above the bar 125, or the matches could be displayed as a single group without the bar 125. In other examples, the matches may be displayed in any order.

In one example, the Address Book 130 may include online presence information (not shown) that indicates whether a user is online. In that case, chat addresses would only be included in the match list 127 if their associated online presence information indicates that the users identified by the addresses are online, e.g., logged into a chat service at the present time. In another example, chat addresses would be displayed differently, e.g., shaded, if their associated online presence information indicates that the associated users are online. In another example, a conditional test may be performed when constructing the match list 127 to determine if each chat user is online at present. In that case, users who are not online would not be displayed in the match list 127 because the conditional test would exclude them. In another example, chat addresses may be displayed in the match list 127 even if the associated users are not online at the present time. Addresses in the address book 130 that do not include a name that starts with the input string are not included in the match list 127. For example, ClarkKent 142 and Zorba7 148 are not included in the match list 127 because they do not include any words that begin with the string "Ga."

A user may select an entry in the match list 127 using, for example, a mouse pointer 126, or a keyboard shortcut (not shown). For example, the user may select Jennie Garth 118 using the mouse pointer 126. Since Jennie Garth is a chat address, a chat message composition user interface will appear on the user's computer screen in response to that selection. In one example, the chat message composition user interface will automatically (i.e., without explicit user input) join a chat conversation with the selected address, i.e., Jennie Garth in this example.

As another example, the user may select David Garlic 120 from the match list 127 using the mouse pointer 124. Since David Garlic is an email address, an email composition user interface will appear on the user's computer screen in response to that selection. In one example, the email composition user interface will automatically include an email "To" field addressed to the selected address, i.e., David Garlic in this example. The email and chat user interfaces are described in more detail below.

FIG. 1E is an illustrative drawing of an address input component and a list of matches for three communication methods in accordance with embodiments of the invention. The address input component 112 of FIG. 1E receives character input. Email addresses, chat addresses, and text message addresses that match the character input are displayed in response to receiving the input. As in the match list 127 of FIG. 1D, the matching addresses are displayed as a match list 187 that includes addresses that match the input string. FIG. 1E shows text message addresses in addition to the email and chat addresses shown in FIG. 1D. For example, if email, chat, and text message addresses are known for a user named Garth, and a prefix of the name Garth is entered in the To field 112, the match list 187 would include the email, chat, and text message addresses for Garth.

In one example, a text message address appears as a user name followed by a phone number, e.g., the match gary jones (650-555-1212) 182. Given that the user's address book contains text message addresses for a user named gary jones and a user named Jesse Garry, the address match 182 is displayed in the match list 187 because a prefix of the associated name, gary jones, matches the input string "Ga" in the input field 112. Similarly, the address match 184 is displayed in the match list 187 because a prefix of the associated name, Jesse Garvey, matches the input string "Ga" in the input field 112. The addresses gary jones 182 and Jesse Garvey 184 may be provided by the user's address book, as described above, or by a contact list, an online service, or some other database or data source.

In FIG. 1E, the addresses include text message addresses as well as the email addresses and chat addresses illustrated in FIG. 1D. In one example, the matching addresses are displayed in groups 190, 192, 194 that correspond to the type of address. The matching email addresses are displayed in a first group 190, the matching chat addresses are displayed in a second group 192 separated from the first group 190 by a separator 125, and the matching text message addresses are displayed in a third group 194 separated from the second group 192 by a separator 185. The first group 190 and the second group 192 are similar to the two groups shown in FIG. 1D. The third group 194 includes a label, "Send a text message" 180, which is displayed in association with the group 194 to inform the user that the addresses matches 182, 184 in the group 194 are for sending text messages. In one example, an address type indicator (not shown), such as a cell phone icon for text message addresses, may be displayed adjacent to each address match to indicate to the user the type of message associated with the address match. The text message address book entry for ClarkKent 156 is not included in the match list 127 because it does not include any words that begin with the string "Ga."

A user may select an entry in the match list 187 using, for example, a mouse pointer 181, or a keyboard shortcut (not shown). For example, the user may select Jesse Garvey 184 using the mouse pointer 181. Since Jesse Garvey 184 corresponds to a text message address, a text message composition user interface (not shown) will appear on the user's computer screen in response to that selection. In one example, the text message composition user interface will be configured to send a text message to Jesse Garvey at the number 408-555-1212, as specified in the match 184.

Figure 1G:
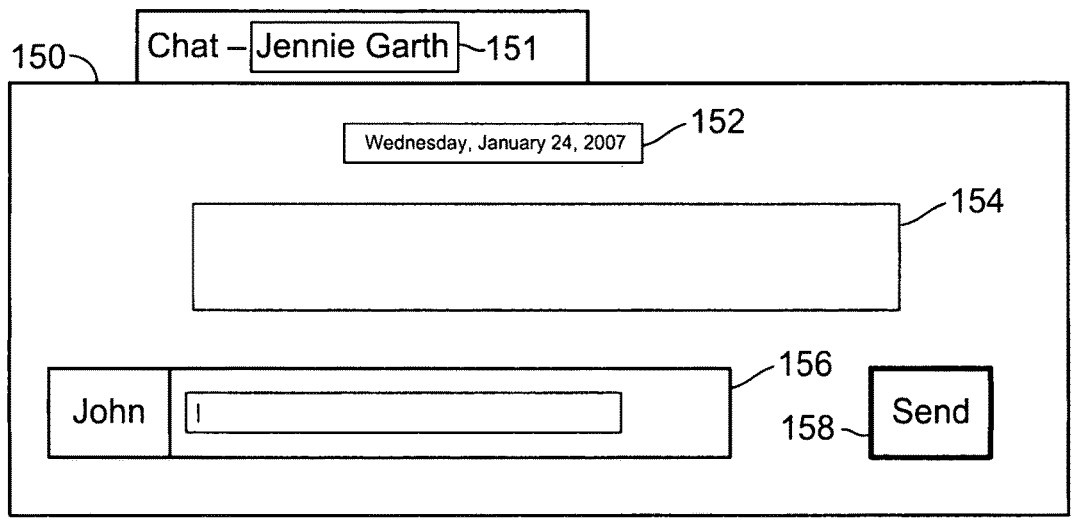
FIG. 1G is an illustrative drawing of a chat composition user interface in accordance with embodiments of the invention.

FIG. 1G is an illustrative drawing of a chat composition user interface 150 in accordance with embodiments of the invention. In one example, FIG. 1G shows the chat composition user interface 150 that would appear in response to a user's selection of the match Jennie Garth 118 as described above with reference to FIG. 1D. That chat composition user interface 150 has been configured to chat with Jennie Garth in response to the user's selection of the match Jennie Garth 118, as shown by the correspondent name Jennie Garth 151. The chat composition user interface 150 includes a date component 152 that displays the present date, a chat messages component 154 that displays previously sent or received chat messages, a chat message text input component 156 that receives text from the user to be sent as a chat message, and a Send button 158 that sends the received text to the chat correspondent, who is Jennie Garth in this example.

Figure 1H:
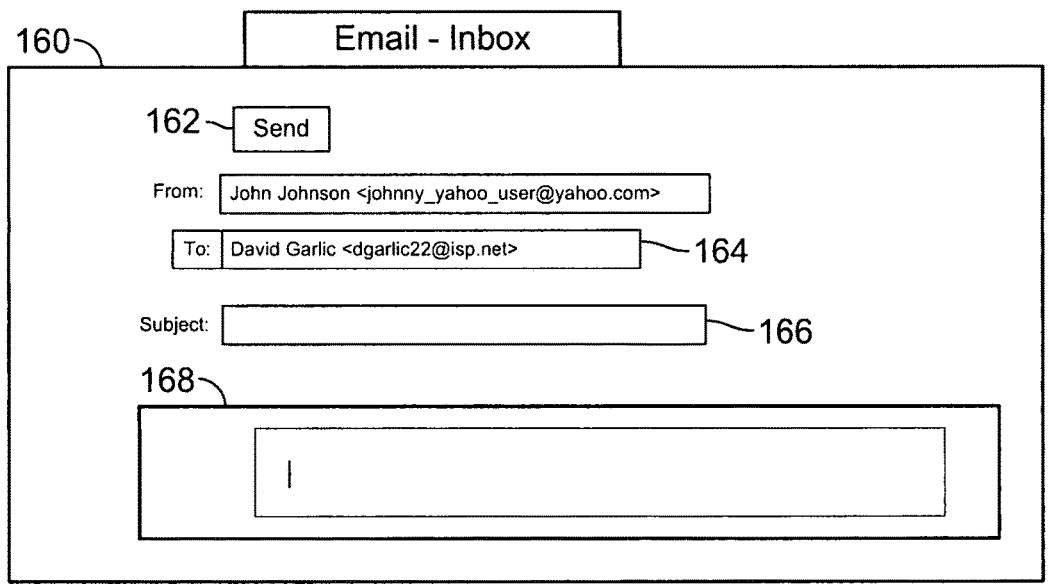
FIG. 1H is an illustrative drawing of an email composition user interface in accordance with embodiments of the invention.

FIG. 1H is an illustrative drawing of an email composition user interface 160 in accordance with embodiments of the invention. In one example, FIG. 1H shows the email composition user interface 160 that would appear in response to a user's selection of the match David Garlic 120 as described above with reference to FIG. 1D. The email composition user interface 160 is configured to send an email message to David Garlic. The email composition user interface 160 includes a Send button 162 for sending email content received in an email input component 168 to a recipient identified in a To component 164 with the subject specified in the Subject component 166. A To component is a user interface component (e.g., widget or input field) that allows a user to specify a name or address to which the message is to be sent. The To component allows the user to specify the name(s) or address(es) to which the message will be sent, For example, the name(s) specified in the To component will appear in the To header of a message when the message is sent. The To component also allows the user to specify the name(s) or address(es) of users who will be "copied" on the message. The copied users may appear in the CC header of a message, for example. The To component 164 has been set to David Garlic in response to the user's selection of David Garlic 120 from the match list 127.

Figure 2A:
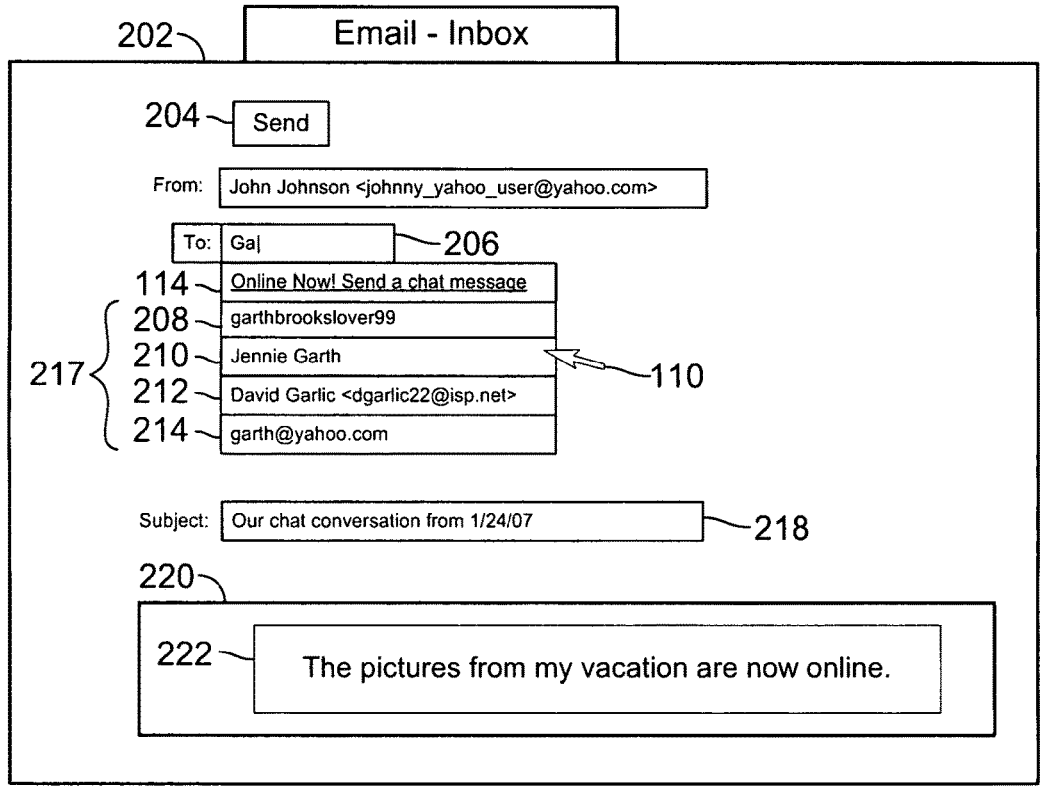
FIG. 2A is an illustrative drawing of an email composition user interface in accordance with embodiments of the invention.

FIG. 2A is an illustrative drawing of an email composition user interface 202 in accordance with embodiments of the invention. FIG. 2A shows how a match list 217 may be integrated with an email composition user interface 202. The email composition user interface 202 also includes a Subject component 218, which has been filled in by the user with a value ("Vacation Photos"), and an email input component 220, for which the user has provided text 222 ("The pictures from my vacation are now online."). The user has typed or otherwise provided the characters "Ga" in the To component 206, and in response, the match list 217 has been displayed. The match list 217 includes two chat address, garthbrookslover99 208 and Jennie Garth 210, and two email addresses, David Garlic 212 and garth@yahoo.com 214, as in FIG. 1D. The user may select any of the entries in the match list to set the To address 206 to the address of the selected user. If the user selects an email address, e.g., garth@yahoo.com 214, the To component 206 will be set to the selected value ("garth@yahoo.com"), and the email composition interface will remain otherwise essentially unchanged. However, if the user selects a chat address, e.g., Jennie Garth 210, the email composition interface will be converted to a chat interface, as described in the co-assigned U.S. patent application Ser. No. 11/710,050, titled "User Interface For Transitioning Between Chat And Email"For example, if the user selects the chat address Jennie Garth 210 using a mouse cursor 216, the email composition user interface 202 will be replaced by a chat message composition interface 230 configured to chat with the selected address, which is Jennie Garth in this example. In one example, other communication protocols may be use din addition to chat and email. For example, selection of a match that represents a Short Message Service (SMS) address may cause the email interface to be converted to an interface for composing an SMS message to the selected address.

Figure 2B:
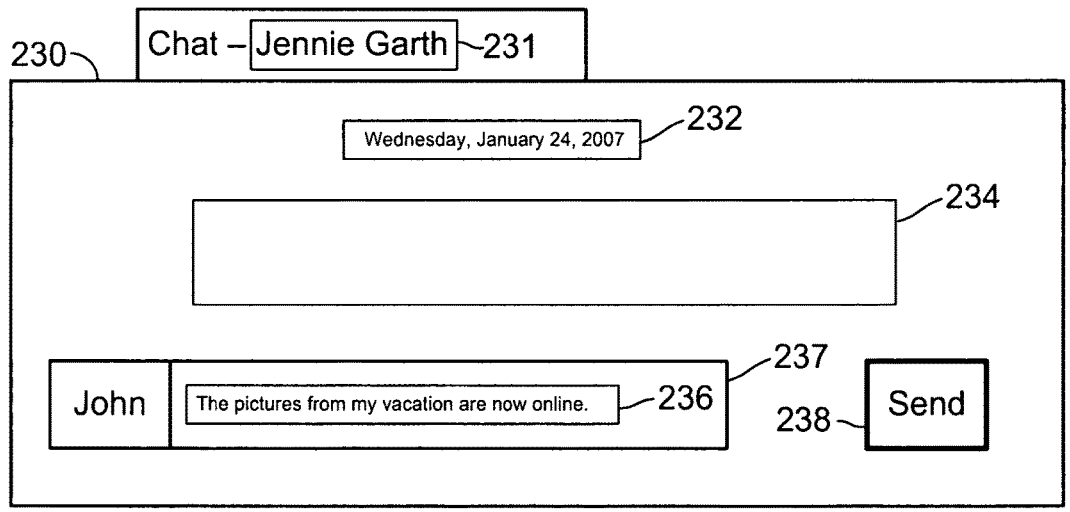
FIG. 2B is an illustrative drawing of a chat composition user interface in accordance with embodiments of the invention.

FIG. 2B is an illustrative drawing of a chat composition user interface 230 in accordance with embodiments of the invention. The chat composition user interface 230 is configured to chat with Jennie Garth, as shown by the correspondent name Jennie Garth 231. The chat composition user interface 230 includes a Send button 238 for sending chat content 236 received in a chat text input component 237 to the chat correspondent, a date display 232, and a chat messages component 234 for displaying previously sent and received chat messages.

Figure 3:
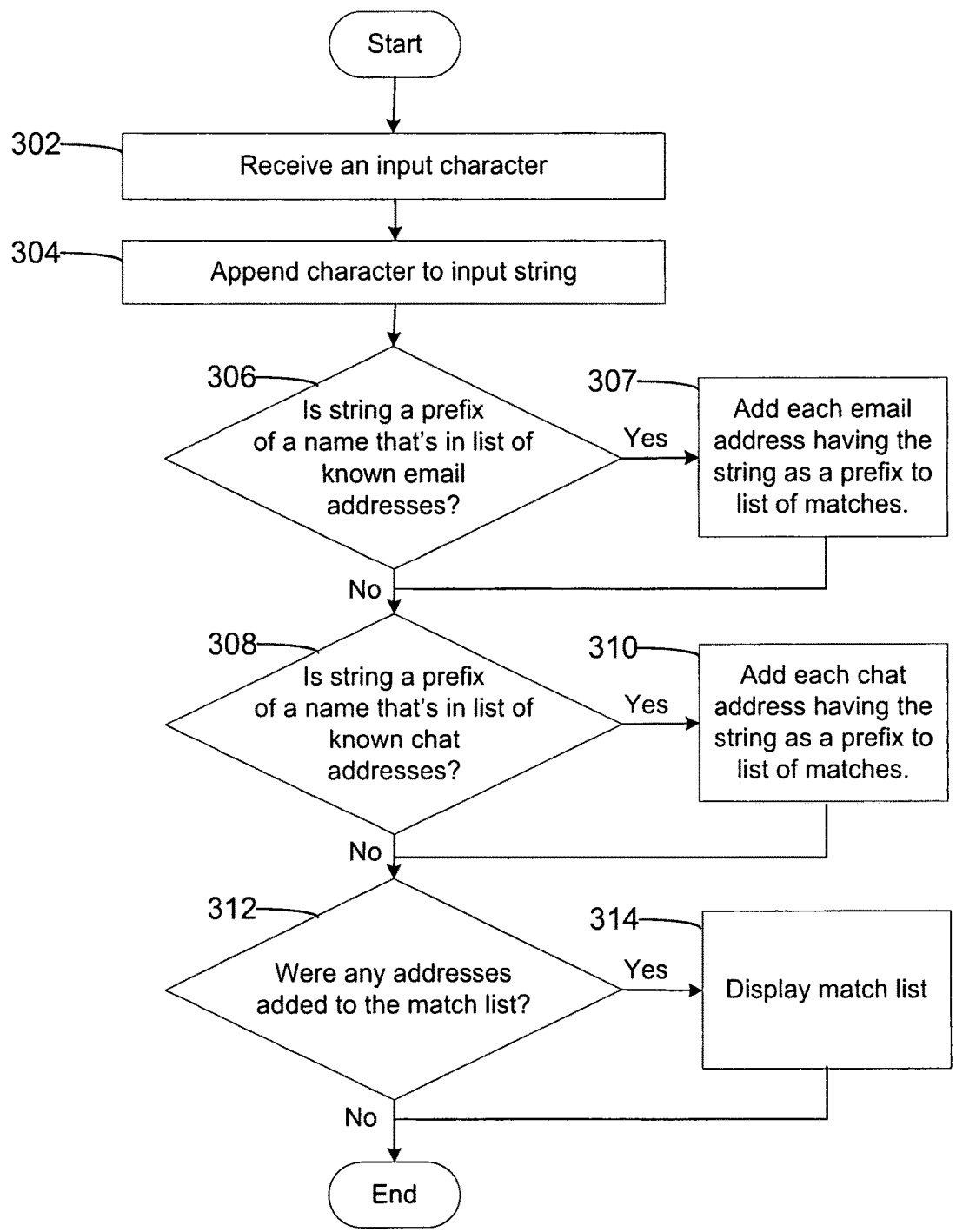
FIG. 3 is an illustrative flow diagram of a process for completing a recipient name or address in accordance with embodiments of the invention.

FIG. 3 is an illustrative flow diagram of a process for completing a recipient name or address in accordance with embodiments of the invention. FIG. 3 may be invoked, for example, in response to input received in a To field of a message composition user interface. FIG. 3 begins at block 302 by receiving at least one character. Block 304 appends the character to the input string. Note that the flow diagram of FIG. 3 may be executed for each character received, in which case a displayed match list is updated as characters are received. The flow diagram may also be executed for multiple characters, in which case the match list may be updated a single time based upon multiple characters. Block 306 determines if the input string is a prefix of a name in a list of known email addresses. As a special case, if the string is empty, the process terminates. The name may be a word, i.e., a token separated by white space, in a multi-word name, such as a first name or a last name. For example, the strings A, AB, and ABC are all prefixes of the string ABC, and the prefix test would be satisfied for each of them. The name may also be a user account name portion of an email address. The list of known email addresses may be, for example, the addresses in an electronic address book or contact list, or in an online service such as a directory service. If block 306 determines that the input string is a prefix of such a name, block 307 adds each email address having the string as a prefix to a list of matches. If the input string is not a prefix of such a name, block 307 is not executed. Block 308 determines if the input string is a prefix of a name in a list of known chat addresses. The string matching technique is essentially the same as that described above for email addresses. The list of known chat addresses may also be, for example, the addresses in an electronic address book, or a list provided by a chat service, or any of the other sources mentioned above for email addresses. Furthermore, in one example, if the message is addressed to more than one recipient, chat addresses will not be displayed in the match list, since chat messages are typically directed to a single recipient. If the input string is a prefix of a known chat address, and the message is not addressed to more than one recipient, then block 310 adds each chat address that has the string as a prefix to the list of matches. If the input string is not a prefix of a known chat address, then block 310 is not executed. Block 312 determines if any addresses were added to the match list by either block 307 or block 310. If so, block 314 causes the match list to be displayed. The match list is displayed, for example, in a message composition user interface adjacent to a To address. Once the match list has been displayed, a message composition interface (e.g., a text editing area) and a send button may be provided to allow a user to compose and send a message to a communication address that the user selects from the match list. Alternatively, a communication-method-specific message composition interface may be displayed with additional user interface components for composing a message Examples of communication-method-specific message composition interfaces include the chat message composition interface 150 shown in FIG. 1G and the email message composition interface 160 shown in FIG. 1H.

Figure 4:
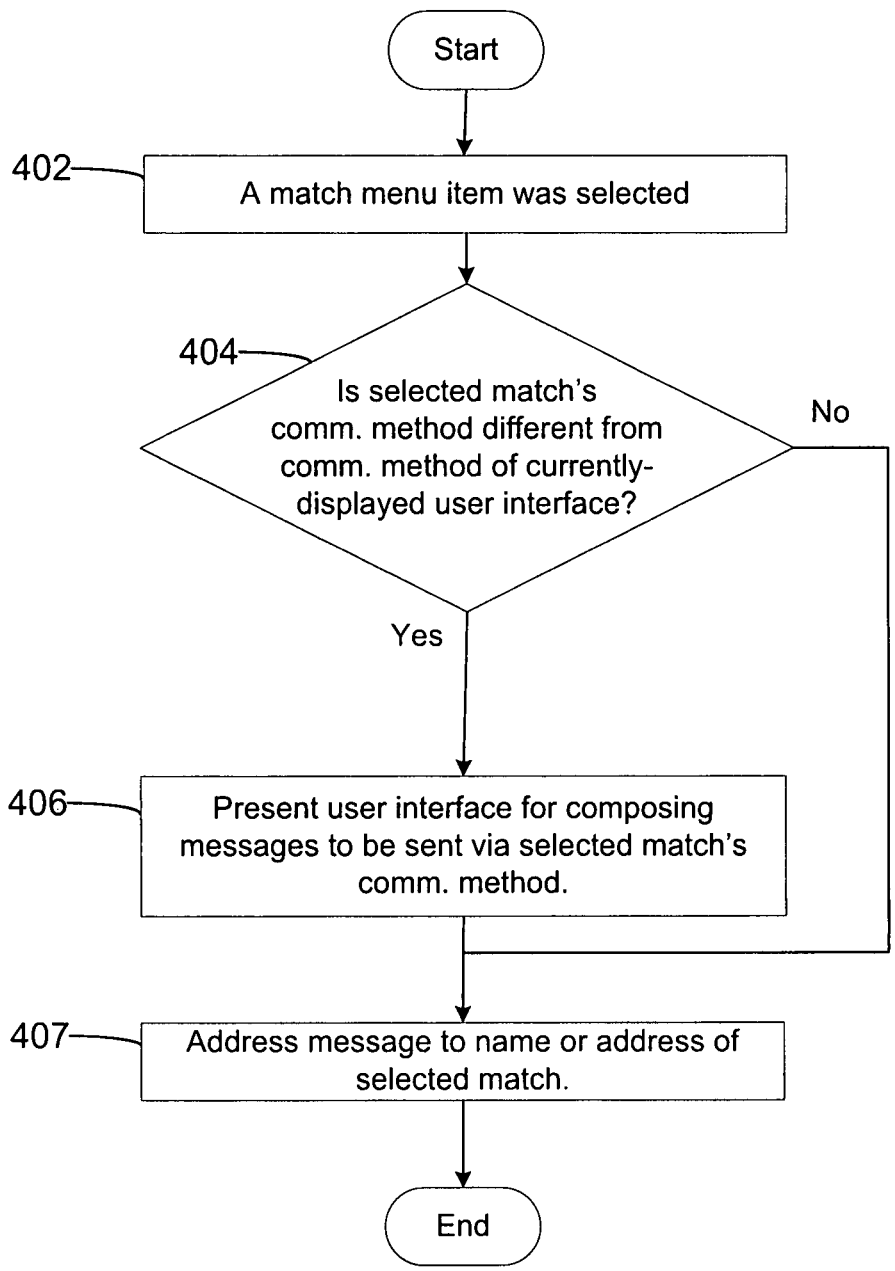
FIG. 4 is an illustrative flow diagram of a process for configuring a user interface in response to selection of a recipient name or address in accordance with embodiments of the invention.

FIG. 4 is an illustrative flow diagram of a process for configuring a user interface in response to selection of a recipient name or address in accordance with embodiments of the invention. In one example, the process shown in FIG. 4 is invoked in response to selection of a match in a match list user interface component, such as the match garth@yahoo.com 122 of the match list 127 shown in FIG. 1D. The process determines whether to convert the presently-displayed user interface to a different user interface for composing a message to the address that corresponds to the selected match, and, if conversion is required, the process presents an interface for composing the message. The process also adds the selected match to an addressee attribute or input field associated with the message. Block 402 is invoked when a match is selected in a match list user interface. Block 404 determines if the communication method (e.g., email, chat, or SMS) that corresponds to the selected match is different from the communication method of the presently-displayed user interface. For example, if the present user interface is a chat user interface, then selection of a match that corresponds to a chat address would not result in a conversion of the user interface, because the two communications do not differ (they are both chat), and selection of a match that corresponds to an email address would result in conversion to an email address, because the two communication methods differ (chat and email are different communication methods). If the two communication methods differ, block 406 presents, i.e., displays and activates, a user interface that corresponds to the selected match. If the two communications methods do not differ, block 406 is not executed, and the present user interface remains active. Block 407 addresses the message that is being composed to the name or address associated with the selected match. For example, block 407 may set the To field 112 of FIG. 1D to the email or chat address associated with the selected match. If the selected match is Jennie Garth 118, then block 407 will set the To field 112 to the value Jennie Garth, which will directly or indirectly cause an addressee attribute, which may be a data value associated with the message in an email client, to be set to the email address that corresponds to the name Jennie Garth. Block 407 may set a user interface field value, and the email client may perform the step of setting the addressee attribute in response, or block 407 may set both a user interface field value and an email address attribute. Block 407 may alternatively set the email address attribute, e.g., by invoking an application programming interface method of the email client, without setting a user interface field or component, depending on the type of interface available for interaction with the email client.

Figure 5:
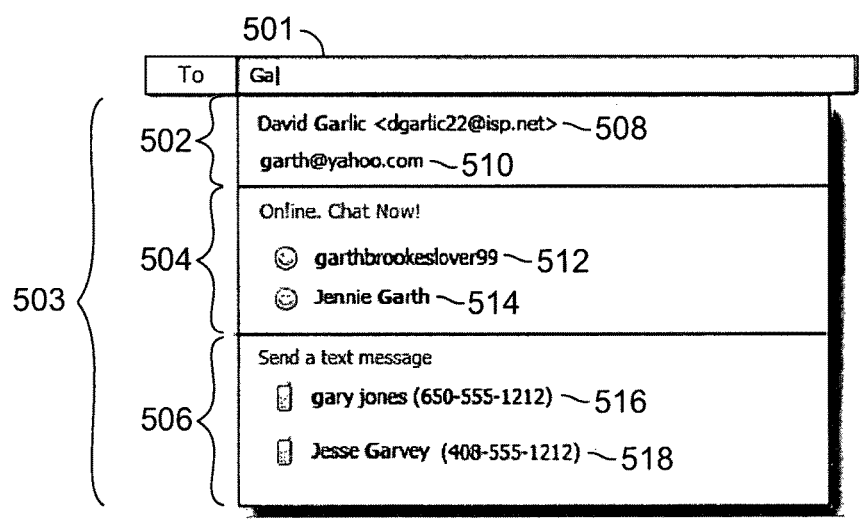
FIG. 5 is an illustrative drawing of an address input user interface displaying a list of matches for multiple communication methods in accordance with embodiments of the invention.

FIG. 5 is an illustrative drawing of an address input user interface 500 displaying a list of matches for multiple communication methods in accordance with embodiments of the invention. The address input user interface 500 includes an address input field 501 for receiving characters that form a string. The string "Ga" is shown in the input field 501, followed by a vertical cursor, which indicates that additional characters received, e.g., from a user typing at a keyboard, will be appended to the string. A match list 503 of addresses that match the input string is displayed below the input field 501. In other example, the match list 503 may be displayed differently, e.g., in a different location relative to the input list, or in a different window, or in a different type of user interface component. The addresses in the match list are shown in three groups: an email match group 502 includes email address that match the string. The matching email addresses are David Garlic 508 and garth@yahoo.com 510, because both of those email addresses include the string "ga". A chat group 504 includes a label ("Online. Chat Now!") and chat addresses that match the string. The matching chat addresses are garthbrookslover99 512 and Jennie Garth 514 because both chat addresses include the string "Ga". A chat address icon may be shown with each chat address. In this example, the chat address icon is a smiling face. A text message group 506 includes a label ("Send a text message") and text messaging addresses that match the string. The matching text message addresses in this example are gary jones 516 and Jesse Garvey 518, because both addresses are associated with a name that includes the string "Ga". A text message icon may be displayed near each text message address 516, 518. In this example, the text message icon is an image of a cellular telephone.

In one example, the matches on the list 503 may be displayed in any order. The matches may be grouped by their associated communication methods, as shown in FIG. 5, or may be displayed in some other order, not necessarily based on the associated communication methods. For example, the matches may be displayed in alphabetical order. If the matches are not displayed in groups, the user can still visually determine the communication method associated with each address by looking at the icon displayed with the address.

A user may select one of the matches, e.g., garth@yahoo.com 510, to cause a user interface for composing a message to that address to be displayed and activated. The user interface will be configured to compose a message to be sent using the communication method (e.g., email, chat, or text messaging) associated with the selected match. Other protocols may be used in addition to email chat, and text messaging. For example, voice telephone numbers may also appear as addresses, in which case selection of a telephone number would cause a voice communication interface to be displayed and activated to allow the user to communicate using an audio protocol.

As another example, if the string "Garth" were received, only addresses that match Garth, e.g., garth@yahoo.com 510, garthbrookslover99 512, and Jennie Garth 514, would be displayed in the match list 503. If no string has been typed, then, in one example, no matches are displayed, and the match list 503 is empty. Typically, as characters are typed in the input field 501 and the string becomes longer, the number of matches decreases, and the list 503 is updated to show the matches that correspond to the current input string.

Figure 6:
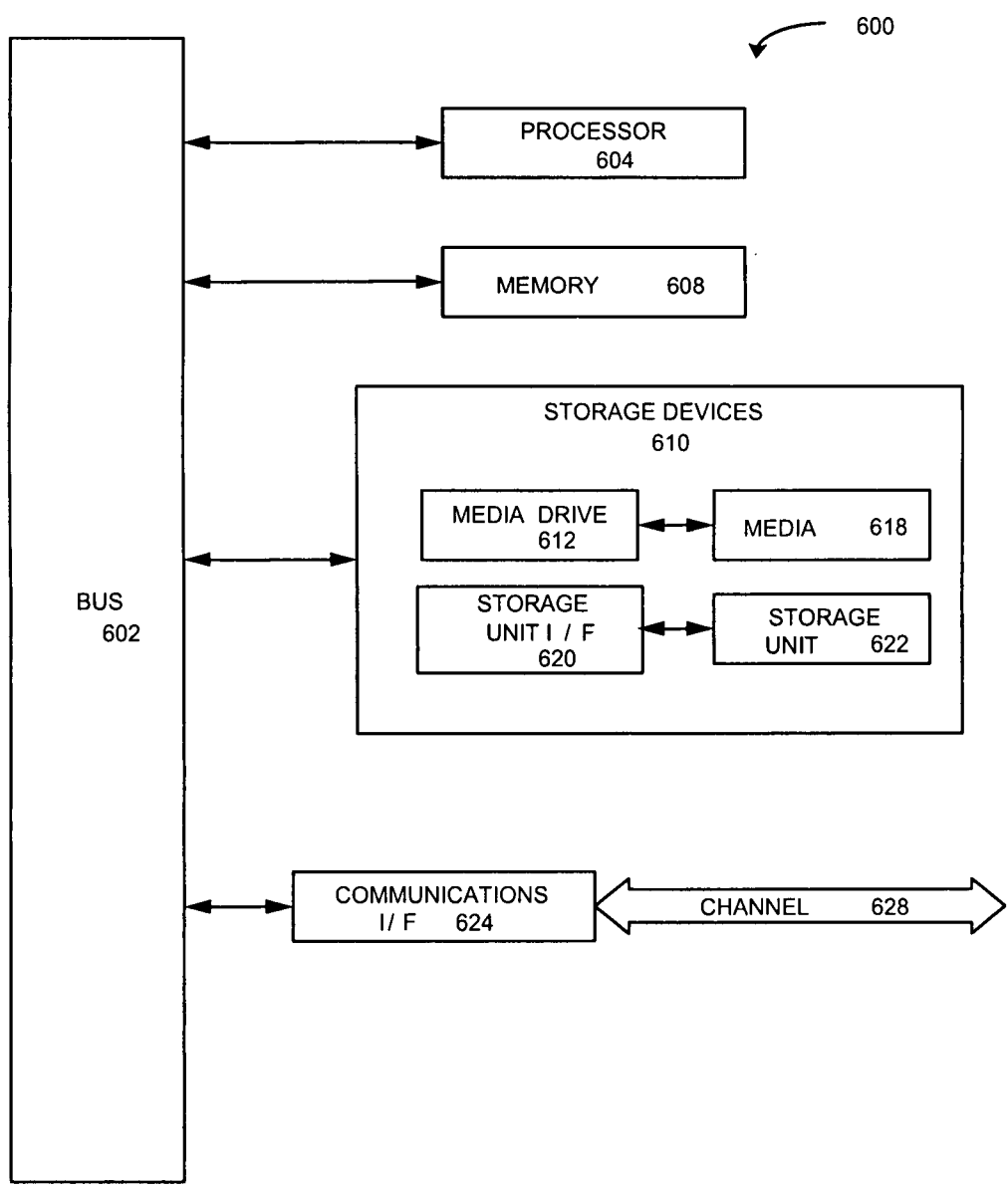
FIG. 6 is an illustrative drawing of an exemplary computer system that may be used in accordance with embodiments of the invention.

FIG. 6 is an illustrative drawing of an exemplary computer system that may be used in accordance with embodiments of the invention. FIG. 6 illustrates a typical computing system 600 that may be employed to implement processing functionality in embodiments of the invention. Computing systems of this type may be used in clients and servers, for example. Those skilled in the relevant art will also recognize how to implement the invention using other computer systems or architectures. Computing system 600 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618, may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624 are in the form of signals which can be electronic, electromagnetic, optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 608, storage device 618, or storage unit 622. These and other forms of computer-readable media may be involved in storing one or more instructions for use by processor 604, to cause the processor to perform specified operations. Such instructions, generally referred to as "computer program code" (which may be grouped in the form of computer programs or other groupings), when executed, enable the computing system 600 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 600 using, for example, removable storage drive 614, drive 612 or communications interface 624. The control logic (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computing device comprising:
   a processor;
   a display; and
   a non-transitory computer-readable storage medium for tangibly storing thereon program logic for execution by the processor, the program logic comprising:
      input logic executed by the processor for receiving an input string in a To address input component of a first user interface used for communicating a message, the To address input component for receiving an address to which the message is to be sent, the input string comprising at least one character;
      display logic executed by the processor for displaying, on the display, a match list in response to receiving the input string, the match list displayed on the display in a second user interface separate from the first user interface, the match list comprising communication addresses associated with a plurality of electronic communication methods including email, text messaging and chat, each communication address comprising the input string,
         the displayed match list visibly displaying each communication address based on whether each address' corresponding user is currently online, such that communication addresses for users currently online are displayed with different display characteristics than those communication addresses of users that are not currently online;
      receiving logic executed by the processor for receiving a selection of a first match within said match list displayed within said second user interface, said first match associated with a first communication method and a first communication address;
      address logic executed by the processor for automatically addressing the message to the first communication address in the first user interface in response to said selection of the first match from the match list; and
      transmission logic executed by the processor for configuring the message according to said first communication method and sending the message via the first communication method.

2. The computing device of claim 1, wherein the first match includes the input string if the input string matches at least a portion of an identifying string associated with the first match.

3. The computing device of claim 1, wherein the address logic is operable to address the message to the first communication address by adding the first communication address to an address attribute associated with the message.

4. The computing device of claim 1, wherein the match list includes a second match, the second match includes the input string, and the second match is associated with a second communication method and a second communication address, and wherein the address logic is operable to address the message to the second communication address in response to selection of the second match from the match list.

5. The computing device of claim 4, wherein the second match includes the input string if the input string matches at least a portion of an identifying string associated with the first match.

6. The computing device of claim 4, wherein the storage medium further comprises: transmission logic for causing the message to be sent to the second communication address via the second communication method if the second match is selected from the match list.

7. The computing device of claim 4, wherein the match list is displayed in an area on a computer screen, the area comprising a first region and a second region, and wherein the display logic is operable to display the first match in the first region, and further operable to display the second match in the second region.

8. The computing device of claim 7, wherein the list of matches is updated as characters of the input string are received.

9. The computing device of claim 4, wherein the display logic is operable to display a third user interface configuration based upon the first communication method in response to selection of the first match from the match list, the display logic is operable to display a fourth user interface configuration based upon the second communication method in response to selection of the second match from the match list, and wherein at least one attribute received for use with the third user interface configuration is available for use with the fourth user interface configuration.

10. The computing device of claim 9, wherein the fourth user interface configuration replaces the third user interface configuration subsequent to selection of the first match.

11. The computing device of claim 1, wherein the first communication address is selected from an online contact list, an online address book, an online directory service, or a combination thereof.

12. The computing device of claim 1 wherein the storage medium further comprises: logic for providing a message composition user interface configuration in response to selection of the first match from the match list, wherein the user interface configuration includes at least one input component for receiving at least one data value, wherein the user interface configuration is based upon the first communication method, wherein the at least one input component corresponds to an attribute of the message, wherein the attribute is to be provided to the communication method when the message is sent, and wherein the user interface includes a send component for causing the message to be sent via the communication method in response to a user action.

13. A method comprising:
- receiving, by a computing device, an input string in a To address input component of a first user interface used for communicating a message, the To address input component for receiving an address to which the message is to be sent, the input string comprising at least one character;
- displaying, on a display of the computing device, a match list in response to receiving the input string, the match list displayed on the display in a second user interface separate from the first user interface, the match list comprising communication addresses associated with a plurality of electronic communication methods including email, text messaging and chat, each communication address comprising the input string,
    - the displayed match list visibly displaying each communication address based on whether each address' corresponding user is currently online, such that communication addresses for users currently online are displayed with different display characteristics than those communication addresses of users that are not currently online;
- receiving, by the computing device, a selection of a first match within said match list displayed within said second user interface, said first match associated with a first communication method and a first communication address;
- automatically addressing, via the computing device, the message to the first communication address in the first user interface in response to said selection of the first match from the match list; and
- configuring, via the computing device, the message according to said first communication method and sending the message via the first communication method.

14. The method of claim 13, wherein the data source that provides addresses comprises an online address book, an online contact list, a list retrieved from an online service, or a combination thereof.

15. The method of claim 13, further comprising the step of: providing, by the computing device, a message composition user interface configuration, wherein the user interface configuration includes at least one input component for receiving at least one data value, wherein the user interface configuration is based upon a communication method associated with the chosen address, wherein the at least one input component corresponds to at least one attribute of the message, wherein the at least one attribute is to be provided to the communication method when the message is sent, and wherein the user interface includes a send component for causing the message to be sent via the communication method in response to a user action.

16. A non-transitory computer readable storage medium tangibly storing program code thereon, that when executed by a computing device, causes performance of a method comprising:
- receiving an input string in a To address input component of a first user interface used for communicating a message, the To address input component for receiving an address to which the message is to be sent, the input string comprising at least one character;
- displaying, on the display, a match list in response to receiving the input string, the match list displayed on the display in a second user interface separate from the first user interface; the match list comprising communication addresses associated with a plurality of electronic communication methods including email, text messaging and chat, each communication address comprising the input string,
    - the displayed match list visibly displaying each communication address based on whether each address' corresponding user is currently online, such that communication addresses for users currently online are displayed with different display characteristics than those communication addresses of users that are not currently online;
- receiving a selection of a first match within said match list displayed within said second user interface, said first match associated with a first communication method and a first communication address;
- automatically addressing the message to the first communication address in the first user interface in response to said selection of the first match from the match list; and
- configuring the message according to said first communication method and sending the message via the first communication method.

* * * * *